United States Patent

[11] 3,595,400

| [72] | Inventor | C. Lynn Peterson<br>Salt Lake City, Utah |
|---|---|---|
| [21] | Appl. No. | 845,644 |
| [22] | Filed | July 8, 1969 |
| [45] | Patented | July 27, 1971 |
| [73] | Assignee | Peterson Filters & Engineering Company<br>Salt Lake City, Utah<br>Continuation of application Ser. No.<br>480,969, Aug. 19, 1965, now abandoned. |

[54] CONVEYOR-TYPE FILTER
16 Claims, 12 Drawing Figs.

[52] U.S. Cl.................................................. 210/327,
210/328, 210/330, 210/333, 210/385, 210/401
[51] Int. Cl. ....................................................B01d 35/08,
B01d 33/32
[50] Field of Search........................................... 210/332,
400, 404, 330, 333, 401, 385, 395, 327, 328

[56] References Cited
UNITED STATES PATENTS

| 910,075 | 1/1909 | Lynch .......................... | 210/216 |
|---|---|---|---|
| 1,026,917 | 5/1912 | Kier............................... | 210/216 |

FOREIGN PATENTS

| 868,740 | 2/1953 | Germany...................... | 210/328 |

Primary Examiner—Frank A. Spear, Jr.
Attorney—McGrew and Edwards

ABSTRACT: A vacuum filter including a pair of laterally spaced endless conveyors rotating about at least two common axes and carrying containers in articulated, closely spaced arrangement. Each container is boxlike member having upright sides, closed bottom, and an open top with drainage outlet in bottom and with bottom pivotally connected to conveyors. Extensible conduits have swivel connection with container outlets and filter media in each container covers its outlet. Plate valve rotating conjointly with conveyors has swivel connection with each conduit and provides filtration pressure to the media through a portion of each cycle and cake removal pressure through another portion.

PATENTED JUL 27 1971
3,595,400
SHEET 1 OF 6
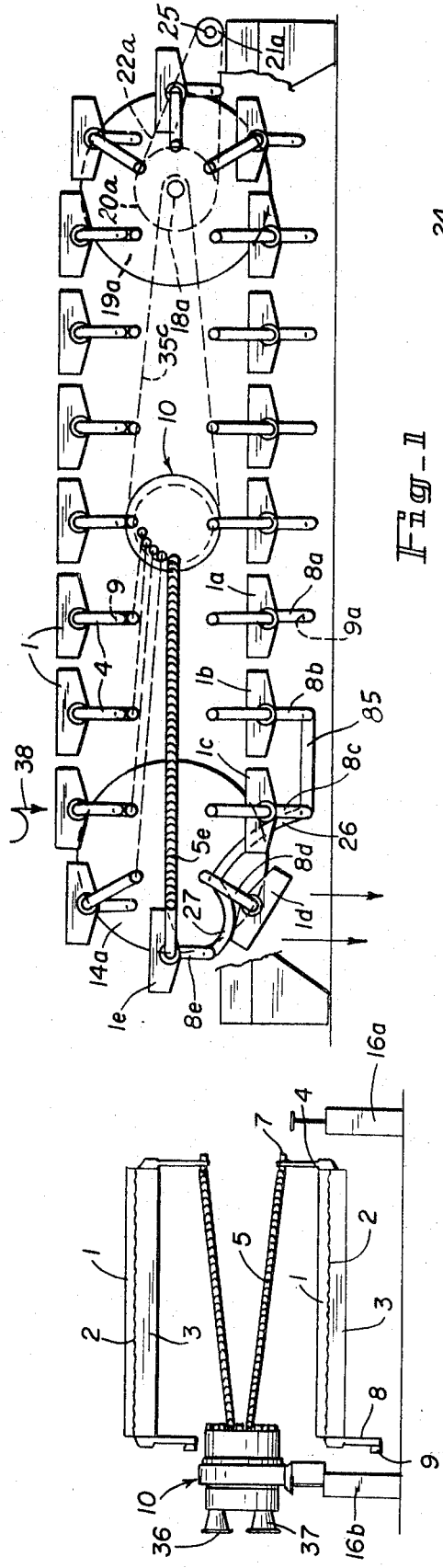
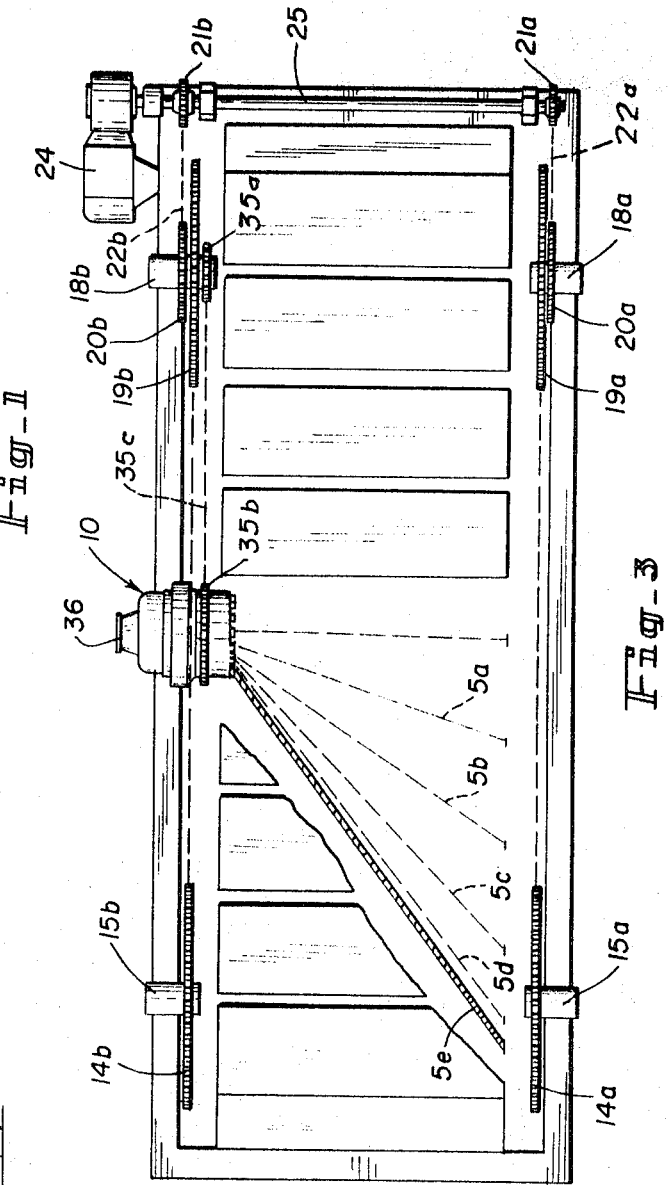
INVENTOR.
C. Lynn Peterson
BY
McGrew Edwards
ATTORNEYS

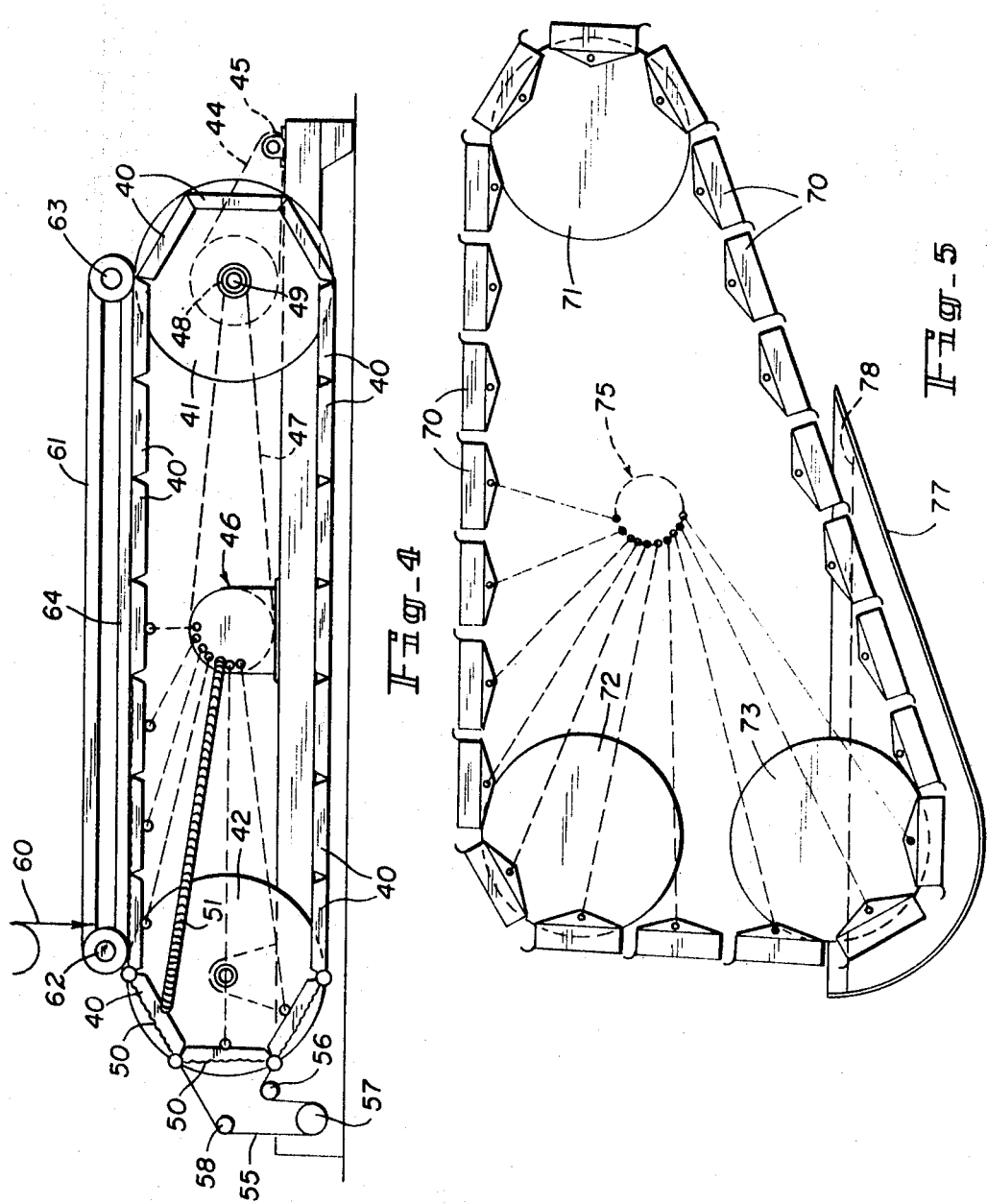

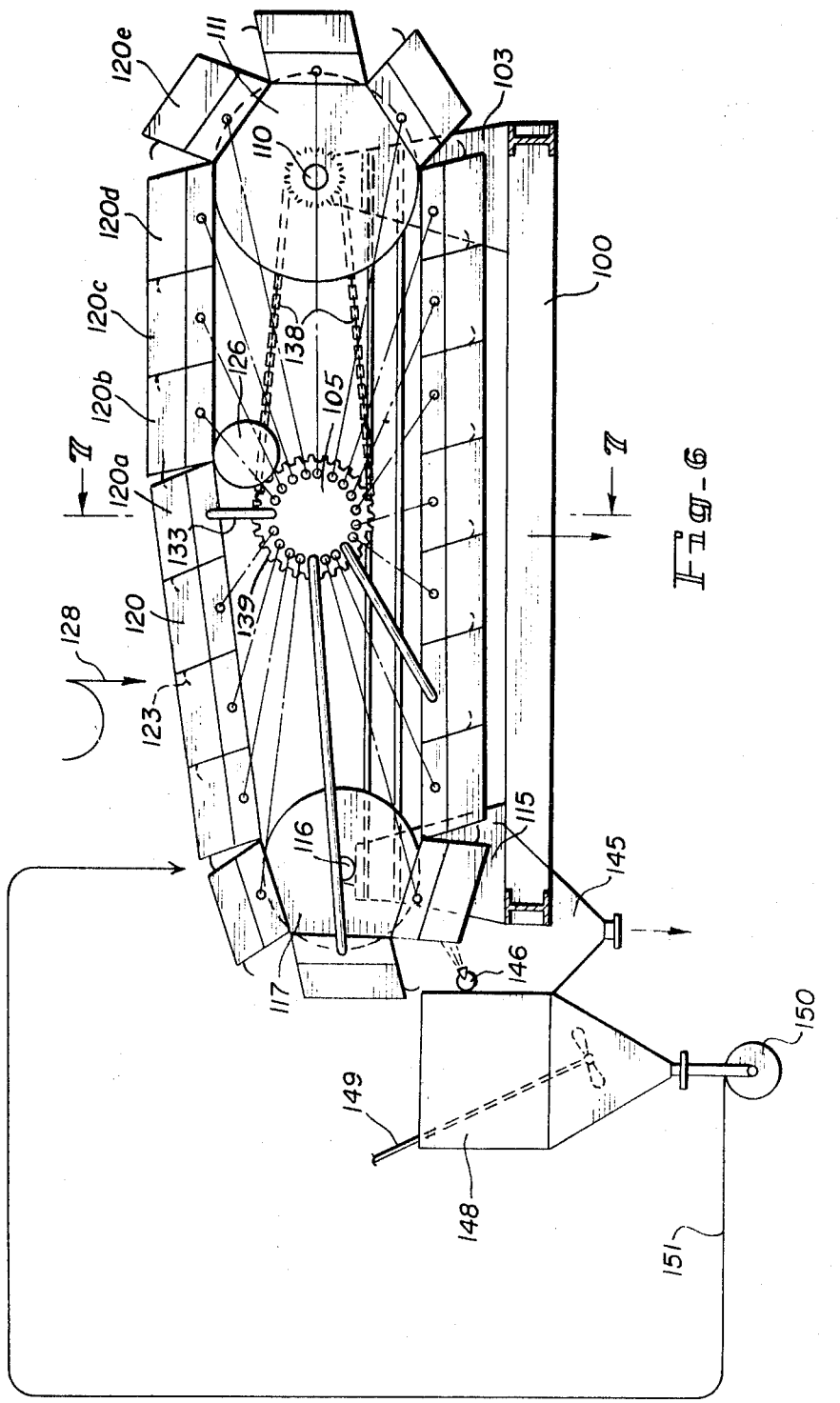

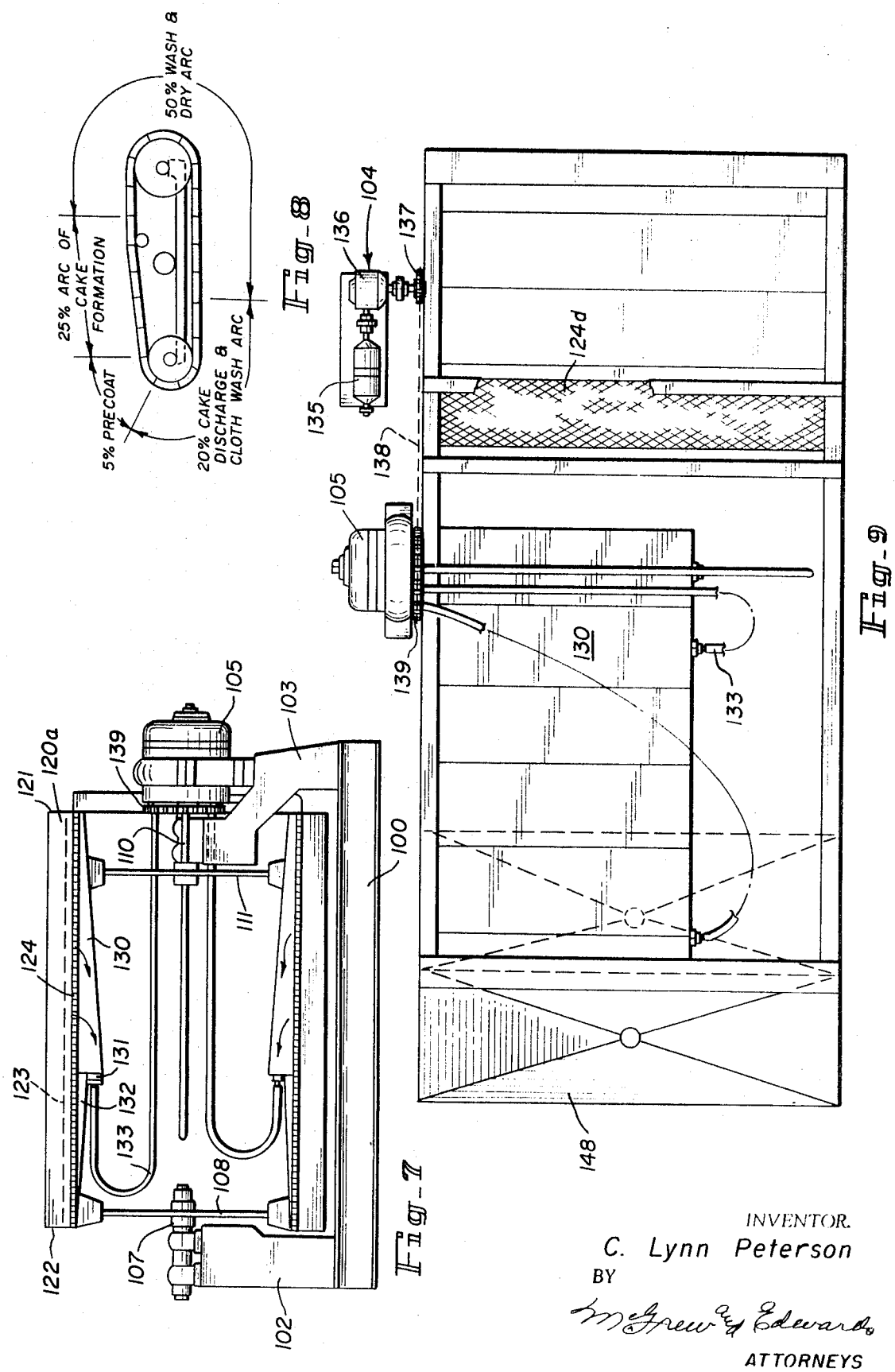

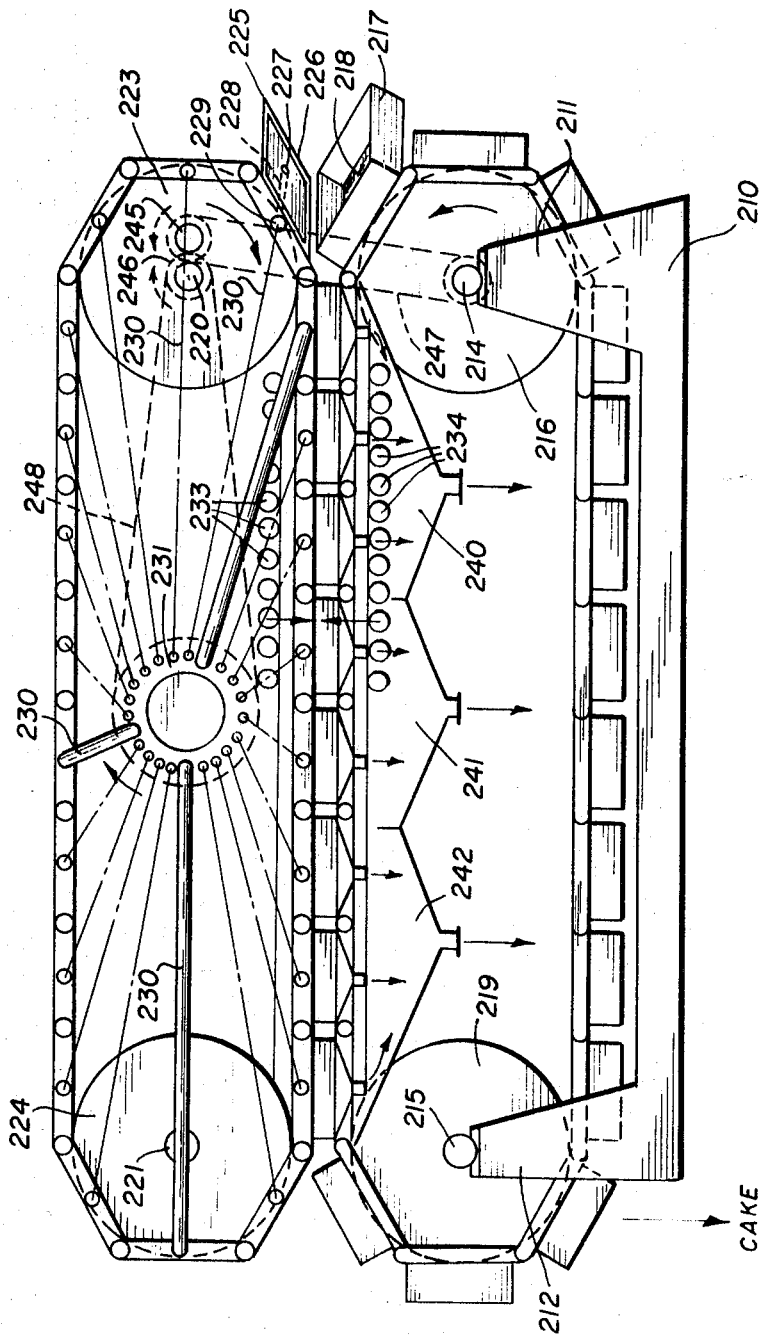

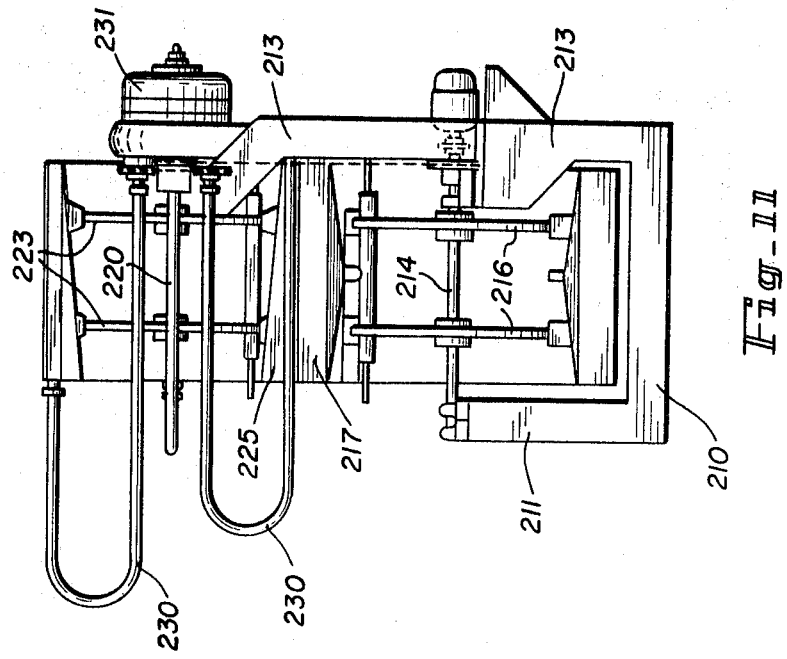
Fig_11
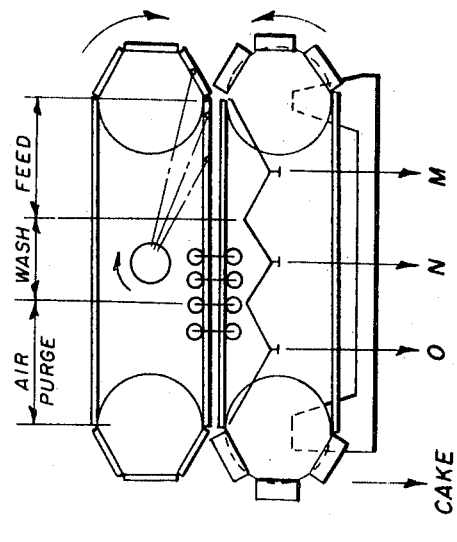
Fig_12
INVENTOR.
C. Lynn Peterson

CONVEYOR-TYPE FILTER

This application is a continuation of applicant's earlier application Ser. No. 480,969, filed Aug. 19, 1965, now abandoned, for CONVEYOR-TYPE FILTER.

This invention relates to filters and more particularly to endless conveyor-type filters provided with a series of filter elements, each of which is individually connected by an extensible conduit to a rotary plate valve.

A number of different types of endless conveyor filters are available commercially; such filters have a horizontal stretch for holding a slurry during a filtering operation. The general type of filter normally used is a rubber belt which has a gridlike upper surface forming a drainage deck, and a filter medium covers the drainage deck surface. The belt is provided with a slot which, in conjunction with a slotted support, provides a means for forming a slide valve through which filtering vacuum is applied to the filter medium. A slurry is fed onto the filter medium on the upper stretch and the filtering vacuum pulls the filtrate through the filter medium and through the slot valve into filtrate receptacles. The resultant filter cake, left on the filter medium, is then discharged as the belt passes over an end pulley. The large contact area between the belt and supporting surface results in a high-horsepower requirement for operation.

With such devices, however, even the low vacuum produces a very heavy load on the slide valve as the belt is in face contact with the valve. Experience has shown that undue wear occurs between the valve and the belt. A number of different types of systems have been tried to prevent such wear, as by Teflon parts, and the belt with a layer of rubber having a high-graphite content attempting to lubricate the belt as it slides over the metal surface of the slotted valve. In another application of a belt filter, water is passed between the belt and the flat surface of the slide valve in an attempt to lubricate the belt and keep a vacuum seal. In any of these applications, however, the structure of the belt on the slide valve is such that an increase in vacuum so greatly increases the pressure of the belt on the valve that the power requirements for moving the belt become excessive, as well as increasing the cost to produce heavy belt sections to withstand the extreme stresses. Further, such heavy belts must be reduced to relative narrow widths.

According to the present invention, I have provided an improvement in conveyor-type filters in which a series of separate filter elements are connected to form an articulated endless conveyor passing over a series of at least two pulleys. An extensible or flexible conduit is attached at one end to each of the filter elements and to a plate valve at the other end so as to provide a conveyor-type filter that will operate at high vacuum and in which the filter force may be exerted on the elements around a substantial part of each full revolution of the elements. The construction does not limit the width of the filter element as with belt filters. Such operations as treating a prefilt or slurry for filtration, cake washing and drying prior to discharge of the filter cake, washing or treating the filter medium prior to the next filtration cycle, air purging the filter element to prevent blowback, backflushing of the filter medium, and under certain conditions precoating the filter medium to prevent blinding with various types of slurry may readily be conducted with the filter of the invention.

Included among the objects and advantages of the present invention is to provide an endless conveyor-type filter. The invention includes a series of individual filter elements connected into the form of an endless conveyor, and conduit means forms a mobile connection from each filter element to a plate valve providing filtering operations on the filter medium of each element throughout the cycle of the filter. The invention provides a series of endless filter elements individually connected to a plate valve whereby filtering operations are performed throughout each revolution. Means are provided for the conjoint rotation of the conveyor and the plate valve so as to maintain relative position of each conduit means on each filter element and the plate valve to maintain a mobile synchronized connection therebetween.

These and other objects and advantages of the invention may be readily ascertained by referring to the following description and appended illustrations in which:

FIG. 1 is a side elevational view of one form of the invention in which a series of filter elements are connected in an endless conveyor configuration and the filter elements remain upright throughout a major cycle of filtration;

FIG. 2 is a schematic end elevational view, in partial section, of the device of FIG. 1;

FIG. 3 is a top plan schematic view, partially cut away, illustrating the operation of the device of FIG. 1;

FIG. 4 is a schematic side elevation of a modified form of an endless conveyor-type filter utilizing a single elongated endless web or band of filter medium to provide the filter medium for a series of interconnected filter plates;

FIG. 5 is a side elevational schematic view of a modified conveyor-type filter providing a bottom feed for a series of interconnected filter elements;

FIG. 6 is a schematic side elevational view of filter system using a modified form of filter according to the invention;

FIG. 7 is an end elevation, in section, of the device of FIG. 6, taken along section line 7–7; 7;

FIG. 8 is a schematic cycle diagram for the operation of one form of filter according to the invention;

FIG. 9 is a schematic top plan, in partial section, of the device of FIG. 6;

FIG. 10 is a schematic side elevational view of a conveyor-type filter arranged as a pressure filter, and showing one filter element in partial perspective to illustrate its construction;

FIG. 11 is an end view of the device of FIG. 10; and

FIG. 12 is a schematic diagram of the operation cycle of the pressure filter of FIG. 10.

In the device illustrated in FIGS. 1 through 3, a series of panlike filter elements are connected into an endless conveyor-type configuration and are mounted on head and tail pulleys for rotation therearound. The pulleys are spaced apart so as to provide upper and lower stretches of the conveyor. Each pan 1 is provided with a filter medium 2, shown schematically in FIG. 2, separating a filtrate chamber 3 at the bottom of the pan. Each pan is provided with a riser 4 at one end which communicates with the filtrate chamber 3 for the discharge of filtrate from the pan. The riser, to clear the rotation of the pan, is connected through a swivel connection with an extensible conduit or tube 5 which is connected through a swivel connection to a rotary plate valve, shown in general by numeral 10, thereby providing a mobile communication between the valve and the riser throughout the rotation of the unit. The rotary plate valve is similar to the type commonly used on drum and other types of rotary filters having individual filter elements. A cam extension or follower 7 on riser 4 provides means for maintaining the riser on the inside of the path of the conveyor, as explained below. Each pan is provided with a cam follower arm 8 and a cam follower 9 attached to the end opposite the riser for turning the pan upside down at one portion of the rotation of the conveyor as shown at the left end of FIG. 1.

The pans 1 are mounted on connecting means, which in one form may be a chain attached at each end of the pans providing an endless configuration. The chains are arranged to be mounted on spaced double sprockets at each end. The sprockets are mounted on stub shafts; for example, sprocket 14a is mounted on stub shaft 15a which in turn is mounted on a pedestal 16a. In like manner, the opposite sprocket 14b is mounted on stub shaft 15b which in turn is mounted on a pedestal 16b at the back side of the unit. In a similar manner, a pair of sprockets 19a and 19b are mounted at the opposite end of the conveyor. The stub shaft is provided for each sprocket so that there is no intervening connection between the two sprockets. A stub shaft 18a mounted on its supports is secured to a sprocket 19a. A drive sprocket 20a is, also, mounted on stub 18a and it is driven by means of a chain 22a by means of a drive sprocket 21a. The opposite sprocket 19b is driven by sprocket 20b mounted on stub shaft 18b, which in turn is driven by chain 22b. The chains 22a and 22b are driven from drive sprockets 21a and 21b mounted on shaft 25. A motor and gear reduction unit 24 provides means for driving the shaft 25.

The pans are mounted on the chain so as to be freely rotatable, and the geometry of the pans on the chains normally maintains the pans in upright position. The riser on each pan, as explained above, also, rotates so as to be maintained on the inside of the conveyor configuration. The pans rotate on the chain so as to remain upright for a major portion of the revolution. The cam arm is rigidly attached to each pan and aids in maintaining the upright stability of the pans, except when in the cam guide turning the pans upside down. The cam guide is mounted adjacent one end of the filter, FIG. 1, and it includes a straight section 85 which is arranged to engage the cam follower 9 on each cam arm 8. In the sequence of pans, shown in FIG. 1, starting with pan 1a the follower 9a is positioned to engage a straight section of cam 85. At pan 1b the cam follower has just engaged the cam. At pan 1c the cam follower is leaving the straight section of cam 85 and is just entering the arcuate cam section 26. Rotation of the chains now causes the follower to move up section 26 to turn the pan upside down to the position of 1d. On leaving cam section 26 the follower enters the arcuate cam section 27 (inverse arc of section 26) where the pan is tilted right side up as illustrated at 1e. In this manner the pans remain upright throughout the rotation except during the period of arc where the cam tilts the pan upside down for discharge of cake into a launder or cake discharge chute, not shown.

The extensible conduit may be a flexible hose or tubing, a corrugated extendable hose, telescoping piping, or pipe with joints, etc. so as to flex during movement or to flex and change its length as the case may be. It is noted that in order for an extensible conduit, such as tubing or a corrugated hose, to change its length as required that the hose or tubing is necessarily elastic or resilient by nature in order to permit change in length. Thus, the conduit provides a mobile communication between its pan and the plate valve 10. As shown in FIG. 3, the difference in distance between the various positions of pans is shown in the dash lines from 5a through 5d indicating the length of extendable conduit 5e which is approximately maximum length.

A chain drive 35c shown in FIG. 3 in dashed lines for clarity, is mounted on a drive sprocket 35a, which is mounted on the stub 18b, to drive a sprocket 35b mounted on the valve trunnion to provide conjoint rotation of the valve with the pans.

A feedbox 38 feeds prefilt to the pans as they approach the top stretch of the conveyor at the left end. Where desired, wash boxes may be provided above the filter elements further along the upper stretch or even along the lower stretch to supply wash water to the cake in the pans. On the upper stretch wash water is fed by gravity and on the lower stretch by spraying or wash pans.

The valve 10 is a more or less conventional rotary plate valve and it may be provided with a suction inlet 36 and a wash port 37. Such valves may, also, be provided with a cloudy filtrate port as is the common practice.

In the modification illustrated in FIG. 4, a series of platelike filter elements 40 are interconnected on spaced endless chains to form an endless conveyor and these are mounted over sprockets 41 at one end and 42 at the opposite end. The sprocket 41, mounted on stub 49, is driven by a chain drive 44 which in turn is driven by a drive sprocket 45. A rotary plate valve 46 is driven by a chain 47 driven by a drive sprocket 48 mounted on shaft or stub 49 of the sprocket 41. By this arrangement the rotary plate valve is driven conjointly with the pans. Each pan 40 includes a drainage deck 50 communicating with an extensible conduit 51. The conduit has a swivel connection to each pan at one end and a swivel connection to the rotary plate valve at the other. The space below the drainage deck provides a filtrate chamber which communicates through the conduit to the plate valve. An endless web of filter medium 55 is passed around the pans, extending from the left of the filter around to the right-hand sprockets back to the left end, and it is removed from the pans over a roller 56. The filter medium web passes around a guide and tracking roller 47 and over return roller 58 so that it passes back onto the pans. Suction and back pressure are applied through the deck to the filter medium on the deck. In this manner the cake is formed on the web by suction, is removed in the cake removal section which includes the rollers 56, 57, and 58. The filter medium may be cleaned prior to its entry back onto the pans. It is obvious that the belt or web of filter medium must be longer than the length of the perimeter of the pans so as to have sufficient length to pass around the discharge rollers.

The end sprockets are mounted in a manner similar to that described for the device in FIG. 1, wherein the end sprockets are mounted on stub shafts to permit the conduits 51 to move between the sprockets as the pans pass around the sprockets. As pointed out above, the plate valve rotates conjointly with the pans so that the conduits maintain their relative position at all times.

Feed for the filter is provided by a feedbox 60 which deposits a prefilt onto the surface of the belt 55 which is mounted on the drain decks 50. Suction is provided through each conduit to draw the liquid from the prefilt leaving a cake on the belt. A deckle belt arrangement 61 mounted on head and tail pulleys 62 and 63 respectively, provide sides, shown as 64, for holding the slurry on the belt to prevent it from running over the sides of the filter. The deckle belt is provided along the upper stretch which holds the slurry on the belt until it is substantially dry enough to maintain its own shape as a cake. The cake remains on the belt as it passes around the sprocket 41 (acting as a tail pulley) and by providing water or other liquid sprays the cake can be washed, continued suction without washing, or further dried as desired until it is passed around the discharge roller 57.

A further modified form of the pan filters is illustrated in FIG. 5 where a series of pans 70 are interconnected to form an endless conveyor of such pans. Pans are mounted over the sprockets 71, 72, and 73 in a general triangular shape. Any of the sprockets may be driven in a manner similar to that described for the sprockets above, and by connecting the driven sprocket with a plate valve 75, the plate valve is rotated conjointly with the pans so that each pan maintains its relative position with the plate valve. Each pan is provided with a drain deck, a filter medium covering the drain deck, a filtrate chamber and a drain which is swivelly connected to an extensible conduit. The extensible conduit may be swivelly connected to the valve or the drain to permit free movement of the conduit in rotation. Feed for the pans is provided by a tank 77 into which the pans dip by virtue of the positioning of the sprocket 73. The suction is applied to the pans as they enter the slurry or prefilt in the tank and is continued after the pans leave the prefilt to dry the cake. Where desired, wash boxes may be provided to apply wash water to the cake on the pans as they travel across the upper stretch. The level of the prefilt 78 is maintained substantially constant by known methods to insure uniform cake pickup and proper efficiency of operation. Cake discharge is performed ahead of the point where the pans enter the prefilt tank and after the pan travels around sprocket 71 to an upside down position. The discharge being by air or other blowback.

In the embodiment shown in FIGS. 6 through 9 a base frame 100 is provided with a series of uprights for supporting the filter. At one end, support 102 provides one support and an opposed parallel support 103 provides support means for bearing sets 107 and 110, respectively. A sprocket 108 is mounted on a stub shaft which is mounted in the bearing set 107 and a sprocket 111 is mounted on a stub shaft which is mounted in bearing 110. A drive assembly 104 is mounted on the support 103 for driving the sprocket 111, and conjointly rotating the plate valve 105 by means of chain 138 mounted on sprocket 139 which turns the plate valve. At the opposite end of the filter a stub shaft 116 supports a sprocket 117 (one of a pair) in a manner similar to the opposite end, the stub being mounted in bearings supported by upright support 115.

At both ends the double sprocket arrangements provide means for supporting a series of pans 120 which are interconnected and mounted on chains. The chains are driven around the sprockets carrying the endless conveyor or pans or filter elements. One section of the filter elements is designated by numeral 120 and successive positions are shown by letters, that is 120a, 120b, 120c, etc. Each pan is provided with opposed sides 121 and 122 and a drain lip 123, illustrated in FIG. 7. A drainage deck 124 is arranged to support a filter medium, not shown, in ore or less conventional fashion, for the filtering operation. A filtrate chamber 130 is provided with a swivel drain 131 to which is connected a flexible conduit 133. The conduit, likewise, is swivelly connected to the plate valve 105. A drain bottom 132 drains the outside part of the filter pan toward the drain 131.

A pair of guide sprockets 126 is mounted generally centerwise of the conveyor to tilt a portion of the pans on the upper stretch to provide for an overflow of feed over a lip 123 on the back of each pan into the following pan. The upper sides seal together forming a chamber which permits the prefilt to fill the pans above the lip so as to overflow back to the lower pan. Feed from a feedbox 128 maintains the pan immediately under it overflowing back to the next adjacent pan. After leaving the feedbox, the level of prefilt in a pan should be below the overflow lip so as it passes over the idler sprockets there is no further overflow and filtering in the pan continues.

In place of the flexible conduit 133 an extendable conduit, telescoping pipe, or the like, may be used for spanning the distance between the swivel on filtrate chamber of each pan and the swivel connection with the rotary plate valve. The rotary plate valve is, also, similar to rotary plate valves which are used with drum filters, disc filters, and the like. The rotary plate valve has a series of openings to which the conduits are swivelly attached. As is conventional in a rotary plate valve, the openings for each conduit progressively pass into communication with spaced orifices on a wear plate of the valve to apply suction to the conduits through one orifice, pressure to the conduits at another orifice, etc. the sequence of filtering steps depending on the particular operation.

Cake from the filter medium is discharged on the lower stretch, the positioning being determined by the operation considering the prefilt, etc. For cleaning the filter medium, a spray nozzle 146 may be provided for spraying the surface of the filter medium discharging into hopper 145.

Where a precoat of a filter aid is desired, a precoat slurry tank 148 may be provided adjacent the equipment. An agitator 149 keeps the filter aid suspended, and as desired the slurry of filter aid is withdrawn from the bottom of the tank through a pump 150 into line 151 and subsequently into the pans 120. The amount of filter aid for the precoat of each filter medium is determined by the particular operation.

A full operating cycle of the device of FIG. 6 is shown in FIG. 8, wherein a precoat portion of the cycle is shown as about 5 percent of the total arc of rotation, the total of rotation being one full revolution of each pan around the conveyor path. About 25 percent of the arc is for cake formation in which suction is applied to the pan and a prefilt is fed into the pans from the feedbox. During this time filtrate passes through the filter medium, a cake is deposited on the filter medium, and the filtrate passes through the flexible conduits through the valve and into containers, not shown. About 50 percent of the arc is allowed for washing and drying the cake which may be accomplished by means of sprays for washing, and drawing air through the cake for drying. This part, also, includes a portion of the revolution where the pans are inverted. About 20 percent of the revolution for each pan is provided for cake discharge, usually by a blowback of air under pressure through the filter medium, and in this area the filter medium washing may be performed where desired.

In the construction-utilizing sprockets on the stubs and the pans spanning the distance between the opposed end sprockets, the pan itself becomes a supporting portion of the conveyor. Thus the pan width is not controlled by the structure itself but by the construction of the pan. Also, in each case a 360° rotary swivel joint is provided at each end of each conduit so that the flexible or extendable conduit will not kink on rotation. The conjoint rotation of the pans and the valve permit the conduits to remain relatively stable in relation between the two elements. Where pans are used with a deck covered with the filter medium, a deck ridge and a relatively small piece of filter medium for covering the same provides a simple device for dressing each of the pans, reducing the normal dressing time compared to available filters.

A pressure filter is readily provided with the device of the present invention by providing a pair of juxtaposed systems where elements from the juxtaposed systems mate to form a closed box into which slurry or prefilt under pressure may be passed for filtering the slurry through a filter medium mounted in one of the elements.

In the modification shown in FIGS. 10 and 11 a base 210 has end supports 211 and 212 mounted at opposite ends thereof and at one side of the frame. On the opposite side of the frame is a back support 213 which extends above the front support 211. A shaft 214 is rotatably mounted by suitable bearing means between said front and back support members at one end. A shaft 215 is similarly mounted on the opposite end of the frame. A series of pans are articulately secured together at the bottom to form an endless train of pans. One such rectangular compartment 217 is shown in FIG. 10 out of position and in perspective to show its construction. This includes a bottom filter medium 218 secured across the bottom of a chamber, which is preferably removable. A support decking (not shown) supports the medium in the bottom of the pan. The pans on the lower endless conveyor are therefore open-topped containers having a filter medium bottom.

Juxtaposed above the lower conveyor is a set of interconnected covers mounted in an endless configuration around sprockets mounted on shaft 220. The shaft is suitably mounted on the upright 213 above shaft 214. In a similar manner shaft 221 is mounted above the shaft 215 on support 212 at the opposite end of the frame. Secured to each shaft is a set of sprockets to support the endless conveyors, one set of sprockets 223, shown in FIG. 11, are mounted on shaft 220. Sprockets 224 are mounted on shaft 221. A series of rectangular cover elements 225 which are articulated to permit them to pass around the sprockets are mounted on the sprockets in an endless configuration. One such cover is shown out of position in FIG. 10 to emphasize its construction. Preferably around the edge of each of the cover members is a sealing arrangement 226 which may be resilient rubber, plastic, or the like, for seating against the top edge of the box 217 forming a sealed container when the two members join together between the two endless conveyors. Each cover also has an opening 227 therein with a passage 228 leading to a side opening 229 to which is attached a flexible coupling. This coupling is connected to a flexible or extensible conduit 230. The opposite end of the conduit is connected to a rotary plate valve 231 of the rotary valve. A series of pressure rollers 233 on the lower stretch of the upper member and rollers 234 underneath the upper stretch of the lower member hold the elements of the two conveyors tightly together during application of pressure internally of the boxes. Thus, a closed chamber is formed by the cover 225 on the box 217 and is held tightly sealed for application of feed under pressure through the flexible conduit into the chamber.

A series of containers mounted beneath the top stretch of the lower conveyor member provides means for the collection of filtrate, wash water, etc. Thus, a container 240 is arranged to collect filtrate forced through the filter medium in the bottom of each chamber. Container 241 may be utilized to collect wash fluid which is passed through the cake. A container 242 is arranged to collect residual filtrate or wash fluid on application of a drying gas or air on the cake.

A drive (not shown) is connected to a gear 245 on the upper member meshed with gear drive 246 mounted on the shaft 220 for rotating the upper member. A chain drive 247 mounted on a sprocket on shaft 245, shown in FIG. 10, drives shaft 214 of the lower set of sprockets for rotating the lower conveyor conjointly with the upper conveyor so that each feed filter chamber 217 registers with its juxtaposed cover or seal plate 225. A chain drive 248 rotates the rotary valve 231 conjointly with the two conveyors for the filtering operation maintaining connection between the valve and each cover through the flexible or extendable conduits.

For one method of operation of the pressure modification of the filter, on rotating the two conveyors in the direction indicated in FIG. 10 a feed filter chamber registers with its seal plate. As the now enclosed feed chamber passes over the filtrate container 240, feed under pressure is forced through the valve, the flexible conduit 230 and into the chamber. Filtrate passes through the filter medium 218 and is discharged into the filtrate collector 240. As the chamber approaches the end of the filtrate collector 240, the feed is cut off and filtration pressure applied to continue the filtration, forcing additional filtrate through the filter medium leaving a cake on the filter medium.

When the container reaches the area of the wash filtrate collector 241, wash fluid is forced through the valve, through the flexible conduit and into the chamber washing the cake. Wash filtrate is discharged into container 241. After passing this area, air or other drying gas may be forced under pressure into the box, through the cake, to remove residual liquid from the cake, the liquid is discharged into the collector 242 and as the chamber approaches the sprocket, pressure is reduced and the cover is removed. As a chamber passes over the end sprocket, the filter cake is discharged and may be deposited in a container therebelow.

The operation cycle is shown in FIG. 12 where the feed is introduced in approximately 40 percent of the cycle, that is, passage of the closed feed chamber between the two endless members, and the cake is then washed for approximately 20 percent. An air purge is then provided for approximately an additional 40 percent to where the chamber is opened for subsequent cake discharge. The filtrate may be recovered from the container at outlet M, the wash filtrate is collected at N, and the dry filtrate at O.

While the invention has been described with reference to particular illustrations, there is no intent to limit the spirit or scope of the invention to precise details so set forth except as defined in the following claims.

I claim:

1. In a vacuum filter, a pair of laterally spaced endless conveyors mounted for conjoint rotation about at least two common axes, a plurality of containers mounted on the conveyors in a closely spaced articulated arrangement for conjoint rotation therewith, each said container comprising a box like member having upright sides, a closed bottom, and an open top, there being at least one drainage outlet in the bottom of the container, filter media in each container covering the outlet, pivot means mounting the bottom of each container on adjoining surfaces of the conveyors, whereby each container is pivoted through an arc of at least 90° in its movement around each common axis by said conveyors, extendable telescoping piping means having a connection with each container outlet for removal of filtrate passing through said filter medium and arranged for rotational movement with the attached container, a rotary plate valve mounted intermediate the ends of said conveyors and arranged for conjoint rotation therewith, each said extendable telescoping piping means having a connection with said plate valve, the outlet connections of the extendable telescoping piping means being disposed at different distances from the plate valve during each conveyor revolution, and means for applying a filtration pressure to said filter media through the rotary valve and associated telescoping piping means for filtrate withdrawal through one portion of each conveyor revolution and cake removal pressure through another portion of said revolution.

2. In a vacuum filter, a pair of laterally spaced endless conveyors mounted for rotation about three common axes, one pair of which supports one conveyor stretch in a substantially horizontal course, another pair of which supports a second conveyor stretch in a substantially vertical course, and a third pair is angularly disposed between the horizontal and vertical courses, a plurality of containers mounted on said conveyors in closely spaced arrangement for conjoint rotation therewith, each said container comprising a boxlike member having upright sides, a closed bottom and an open top, there being at least one drainage outlet in the bottom of the container, filter media in each container covering the outlet, pivot means mounting the bottom of each container on adjoining surfaces of the conveyors, whereby each container is pivoted through an arc of at least 90° in its movement around each common axis by said conveyors, conduit means having a swivel connection with each container outlet for removal of filtrate passing through said filter medium and arranged for rotational movement about a common central axis with the attached conveyor, the distance from said central axis to the containers being relatively short in a vertical plane and much longer in a horizontal plane, each said conduit means having a swivel connection with a plate valve mounted on said central axis, means for rotating said conveyors and said plate valve, and means for applying differential pressures to said filter media through the rotary valve and associated conduit for filtrate withdrawal through a major portion of each conveyor revolution and cake removal pressure through another portion of said revolution.

3. A filter as defined in claim 2, including a slurry tank in which the lowermost common axis is at least partially submerged.

4. A filter as defined in claim 2, in which the conduit means disposed in a substantially horizontal position is more than twice the length of the conduit means disposed in a substantially vertical position so as to maintain a low headroom for the filter.

5. A filter comprising a pair of juxtapositioned endless conveying means arranged to jointly form a series of closed containers therebetween along at least one associated conveying stretch, a filter medium in each container covering a drain opening for removal of filtrate passing through said opening, conduit means connected with and movable with an attached container, the other end of the conduit means being connected to a rotary valve means for rotation conjointly with said conveying means, each said conduit means providing a fluid connection from each container to said valve through each complete revolution, means for directing slurry under pressure through said valve and conduit means to said closed containers for moving filtrate therethrough and leaving a cake thereon, and means for applying cake removal pressure during a portion of the rotation of said conveying means.

6. In a vacuum filter, endless conveyor means mounted for rotation about at least two substantially parallel axes, a plurality of containers mounted on said conveyor means for conjoint rotation therewith, each said container having upright sides, a closed bottom and open top, there being at least one drainage outlet defined in the bottom of each said container, filter media in each said container covering said drainage outlet therein, extendable telescoping piping means connected with each said container drainage outlet for removal of filtrate passing through said filter medium, a rotatable plate valve, each said extendable telescoping piping means being connected to said plate valve, means for conjointly rotating said conveyor means and said plate valve whereby said drainage outlet of each said container is disposed at different distances from said plate valve during each revolution of said conveyor means so that each said telescoping piping means is extended and contracted between its associated one of said drainage outlets and said plate valve during each revolution of said conveyor means, and means for applying a filtration pressure to each said filter media through said plate valve and its associated one of said telescoping piping means for filtrate withdrawal through a portion of each revolution of said conveyor means and cake removal pressure through another portion of each revolution of said conveyor means.

7. In an endless conveyor-type filter wherein a plurality of open top, panlike filter elements are mounted on an endless conveyor which rotates around a pair of substantially parallel axes so as to provide upper and lower substantially horizontal conveyor stretches, the improvement of:
   means pivotably mounting each of said filter elements on said endless conveyor for rotation about said parallel axes;
   arm means mounted to extend from the bottom of each of said filter elements for normally biasing said filter elements in a horizontal position with their open top portions facing upward;
   cam follower means carried by each of said filter elements;
   cam guide means mounted to engage each of said cam follower means during a portion of each revolution of said conveyor, said cam guide means being operable to guide each of said cam follower means so as to pivot its associated one of said filter elements to a substantially inverted position whereby to discharge filter cakes formed in said filter elements therefrom.

8. The invention recited in claim 7, wherein said cam guide means is mounted adjacent one of said axes around which said conveyor rotates and defines a first arcuate guide path which is operable to guide each of said cam follower means so as to substantially invert said filter element with which each of said cam follower means is associated.

9. The invention recited in claim 8, wherein each of said cam follower means is mounted on said arm means of said filter element with which it is associated.

10. The invention recited in claim 8, wherein said cam guide means defines a second arcuate guide path which is connected with the exit portion of said first arcuate guide path, said second arcuate guide path being operable to guide each of said cam follower means so as to return said filter element with which each of said cam follower means is associated to its normal horizontal position.

11. The invention recited in claim 7, wherein:
   each of said cam follower means is mounted on said arm means of said filter element with which it is associated; and
   said cam guide means defines a straight guide path which is connected with the entrance portion of said first arcuate guide path, said straight guide path being operable to engage and guide each of said cam follower means into said first arcuate guide path.

12. The invention recited in claim 11, wherein said cam guide means defines a second arcuate guide path which is connected with the exit portion of said first arcuate guide path, said second arcuate guide path being operable to guide each of said cam follower means so as to return said filter element with which each of said cam follower means is associated to its normal horizontal position.

13. The invention recited in claim 7, including:
   rotatable plate valve means for selectively applying filtration pressure and cake removal pressure to said filter elements;
   extendable conduit means connected between each of said filter elements and said rotatable plate valve; and
   means for conjointly rotating said conveyor and said plate valve means.

14. The invention recited in claim 13, wherein said rotatable plate valve means has its rotatable valve portion positioned intermediate said axes around which conveyor rotates.

15. The invention recited in claim 13, wherein said extendable conduit is formed of telescoping piping.

16. The invention recited in claim 15, wherein said rotatable plate valve means has its rotatable valve portion positioned intermediate said axes around which said conveyor rotates.